US011830136B2

United States Patent
Huber

(10) Patent No.: US 11,830,136 B2
(45) Date of Patent: Nov. 28, 2023

(54) METHODS AND SYSTEMS FOR AUTO-LEVELING OF POINT CLOUDS AND 3D MODELS

(71) Applicant: Kaarta, Inc., Pittsburgh, PA (US)

(72) Inventor: Steven Huber, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 3 days.

(21) Appl. No.: 17/070,228

(22) Filed: Oct. 14, 2020

(65) Prior Publication Data

US 2021/0027477 A1 Jan. 28, 2021

Related U.S. Application Data

(63) Continuation of application No. PCT/US2019/038688, filed on Jun. 24, 2019.

(60) Provisional application No. 62/696,568, filed on Jul. 11, 2018, provisional application No. 62/694,327, filed on Jul. 5, 2018.

(51) Int. Cl.
*G06T 17/10* (2006.01)
*G06T 3/40* (2006.01)
*G06T 7/35* (2017.01)

(52) U.S. Cl.
CPC ............ *G06T 17/10* (2013.01); *G06T 3/4023* (2013.01); *G06T 7/35* (2017.01); *G06T 2207/10028* (2013.01); *G06T 2207/20024* (2013.01); *G06T 2207/20068* (2013.01)

(58) Field of Classification Search
CPC ........... G06T 17/10; G06T 2207/10028; G06T 2207/20024; G06T 2207/20068; G06T 2210/56; G06T 3/4023; G06T 7/35; G06V 10/757
See application file for complete search history.

(56) References Cited

U.S. PATENT DOCUMENTS

| | | | |
|---|---|---|---|
| 5,988,862 | A | 11/1999 | Kacyra et al. |
| 6,009,188 | A | 12/1999 | Cohen et al. |
| 6,111,582 | A | 8/2000 | Jenkins |
| D432,930 | S | 10/2000 | Sanoner |
| 6,208,347 | B1 | 3/2001 | Migdal et al. |
| 6,771,840 | B1 | 8/2004 | Ioannou et al. |
| 7,567,731 | B2 | 7/2009 | McDowall et al. |

(Continued)

FOREIGN PATENT DOCUMENTS

| | | | |
|---|---|---|---|
| CN | 102508258 A | | 6/2012 |
| CN | 102607526 A | * | 7/2012 |

(Continued)

OTHER PUBLICATIONS

From Point Clouds to Building Information Models: 3D Semi-Automatic Reconstruction of Indoors of Existing Buildings, Oct. 12, 2017, Helene Macher (Year: 2017).*

(Continued)

*Primary Examiner* — Ming Wu
(74) *Attorney, Agent, or Firm* — David G. Oberdick; Michael G. Monyok

(57) ABSTRACT

A method includes creating a point cloud model of an environment, applying at least one filter to the point cloud model to produce a filtered model of the environment and defining a plane in the filtered model corresponding to a horizontal expanse associated with a floor of the environment.

19 Claims, 3 Drawing Sheets

(56) References Cited

U.S. PATENT DOCUMENTS

| | | |
|---|---|---|
| 7,752,483 B1 | 7/2010 | Muresan et al. |
| 8,180,107 B2 | 5/2012 | Broaddus et al. |
| 8,406,994 B1 | 3/2013 | Pu et al. |
| 8,676,498 B2 | 3/2014 | Ma et al. |
| 8,996,228 B1 | 3/2015 | Ferguson et al. |
| 9,031,809 B1 | 5/2015 | Kumar et al. |
| 9,043,069 B1 | 5/2015 | Burnette et al. |
| 9,143,413 B1 | 9/2015 | Manku et al. |
| 9,315,192 B1 | 4/2016 | Zhu et al. |
| D823,920 S | 7/2018 | Wiegmann |
| 10,296,828 B2 | 5/2019 | Viswanathan |
| 10,442,431 B2 | 10/2019 | Chutorash |
| 10,551,850 B2 | 2/2020 | Panzica et al. |
| 10,962,370 B2 | 3/2021 | Zhang et al. |
| 10,989,542 B2 | 4/2021 | Zhang et al. |
| 11,009,884 B2 | 5/2021 | Huval et al. |
| 11,194,938 B2 | 12/2021 | Kincart et al. |
| 11,237,563 B2 | 2/2022 | Javault et al. |
| 11,398,075 B2 | 7/2022 | Zhang et al. |
| 11,506,500 B2 | 11/2022 | Zhang et al. |
| 11,567,201 B2 | 1/2023 | Zhang et al. |
| 11,573,325 B2 | 2/2023 | Huber et al. |
| 11,585,662 B2 | 2/2023 | Zhang et al. |
| 2003/0001835 A1 | 1/2003 | Dimsdale et al. |
| 2003/0160785 A1 | 8/2003 | Baumberg |
| 2005/0168437 A1 | 8/2005 | Carl et al. |
| 2005/0203930 A1 | 9/2005 | Bukowski et al. |
| 2005/0286757 A1 | 12/2005 | Zitnick et al. |
| 2006/0188143 A1* | 8/2006 | Strassenburg-Kleciak ........... G06T 17/05 382/154 |
| 2007/0097120 A1 | 5/2007 | Wheeler et al. |
| 2007/0262988 A1 | 11/2007 | Christensen et al. |
| 2007/0291233 A1 | 12/2007 | Culbertson et al. |
| 2008/0033645 A1 | 2/2008 | Levinson et al. |
| 2008/0112610 A1 | 5/2008 | Israelsen et al. |
| 2008/0243426 A1* | 10/2008 | Lundgren ............. G01S 13/422 702/151 |
| 2009/0043439 A1 | 2/2009 | Barfoot et al. |
| 2009/0237297 A1 | 9/2009 | Davis et al. |
| 2009/0262974 A1 | 10/2009 | Lithopoulos et al. |
| 2010/0090899 A1 | 4/2010 | Zhao et al. |
| 2010/0111370 A1 | 5/2010 | Black et al. |
| 2010/0286905 A1 | 11/2010 | Goncalves et al. |
| 2011/0134225 A1 | 6/2011 | Saint-Pierre et al. |
| 2011/0178708 A1 | 7/2011 | Zhang et al. |
| 2011/0282622 A1 | 11/2011 | Canter |
| 2011/0300929 A1 | 12/2011 | Tardif et al. |
| 2011/0301786 A1 | 12/2011 | Allis et al. |
| 2012/0123615 A1 | 5/2012 | Bourzier |
| 2013/0085378 A1 | 4/2013 | Wedan et al. |
| 2013/0135305 A1 | 5/2013 | Bystrov et al. |
| 2013/0176305 A1 | 7/2013 | Ito et al. |
| 2013/0181983 A1 | 7/2013 | Kitamura et al. |
| 2013/0321418 A1 | 12/2013 | Kirk |
| 2013/0325244 A1 | 12/2013 | Wang et al. |
| 2014/0043436 A1 | 2/2014 | Bell et al. |
| 2014/0125768 A1 | 5/2014 | Bell et al. |
| 2014/0180579 A1 | 6/2014 | Friend et al. |
| 2014/0180914 A1 | 6/2014 | Abhyanker |
| 2014/0193040 A1 | 7/2014 | Bronshtein |
| 2014/0214255 A1 | 7/2014 | Dolgov et al. |
| 2014/0278570 A1 | 9/2014 | Plummer et al. |
| 2014/0297092 A1 | 10/2014 | Delp |
| 2014/0300885 A1 | 10/2014 | Debrunner et al. |
| 2014/0300886 A1 | 10/2014 | Zogg et al. |
| 2014/0301633 A1 | 10/2014 | Furukawa et al. |
| 2014/0316698 A1 | 10/2014 | Roumeliotis et al. |
| 2014/0333741 A1 | 11/2014 | Nerurkar et al. |
| 2014/0350836 A1 | 11/2014 | Stettner et al. |
| 2014/0379256 A1 | 12/2014 | Stipes et al. |
| 2015/0015602 A1 | 1/2015 | Beaudoin |
| 2015/0063683 A1 | 3/2015 | Fu |
| 2015/0063707 A1 | 3/2015 | Fu |
| 2015/0142378 A1 | 5/2015 | Hebert et al. |
| 2015/0243080 A1 | 8/2015 | Steinbach et al. |
| 2015/0317832 A1 | 11/2015 | Ebstyne et al. |
| 2015/0331111 A1 | 11/2015 | Newman et al. |
| 2015/0350378 A1 | 12/2015 | Hertel et al. |
| 2016/0070265 A1 | 3/2016 | Liu et al. |
| 2016/0086336 A1 | 3/2016 | Lin et al. |
| 2016/0125226 A1 | 5/2016 | Huang |
| 2016/0140757 A1 | 5/2016 | Voth |
| 2016/0189348 A1 | 6/2016 | Canter |
| 2016/0234476 A1 | 8/2016 | Millett |
| 2016/0260250 A1 | 9/2016 | Jovanovic et al. |
| 2016/0266256 A1 | 9/2016 | Allen et al. |
| 2016/0274589 A1 | 9/2016 | Templeton et al. |
| 2016/0349746 A1 | 12/2016 | Grau |
| 2016/0379366 A1 | 12/2016 | Shah et al. |
| 2017/0116781 A1 | 4/2017 | Babahajiani et al. |
| 2017/0122736 A1 | 5/2017 | Dold et al. |
| 2017/0123066 A1 | 5/2017 | Coddington et al. |
| 2017/0186221 A1 | 6/2017 | Khorasani |
| 2017/0191826 A1 | 7/2017 | Nagori et al. |
| 2017/0208251 A1 | 7/2017 | Shamir et al. |
| 2017/0212529 A1 | 7/2017 | Kumar et al. |
| 2018/0038694 A1 | 2/2018 | Bruemmer et al. |
| 2018/0075648 A1 | 3/2018 | Moghadam et al. |
| 2018/0260613 A1 | 9/2018 | Gao |
| 2018/0342080 A1 | 11/2018 | Maddern et al. |
| 2019/0003836 A1 | 1/2019 | Zhang et al. |
| 2019/0052844 A1 | 2/2019 | Droz et al. |
| 2019/0235083 A1 | 8/2019 | Zhang et al. |
| 2019/0346271 A1 | 11/2019 | Zhang et al. |
| 2020/0142074 A1 | 5/2020 | Huber et al. |
| 2020/0217666 A1 | 7/2020 | Zhang et al. |
| 2020/0233085 A1 | 7/2020 | Zhang et al. |
| 2020/0265562 A1* | 8/2020 | Nagare .................. G06T 5/008 |
| 2020/0349761 A1 | 11/2020 | Zhang et al. |
| 2020/0400442 A1 | 12/2020 | Huber et al. |
| 2021/0025998 A1 | 1/2021 | Huber |
| 2021/0293544 A1 | 9/2021 | Zhang et al. |
| 2021/0293546 A1 | 9/2021 | Zhang et al. |
| 2023/0130320 A1 | 4/2023 | Zhang et al. |

FOREIGN PATENT DOCUMENTS

| | | | |
|---|---|---|---|
| CN | 102819863 A | 12/2012 | |
| CN | 104913763 A | 9/2015 | |
| CN | 105164494 A | 12/2015 | |
| CN | 106204611 A * | 12/2016 | ............. G06T 17/05 |
| CN | 109313024 A | 2/2019 | |
| DE | 102014019671 A1 | 6/2016 | |
| EP | 2133662 B1 | 2/2012 | |
| EP | 3109589 A1 | 12/2016 | |
| EP | 3427008 A1 | 1/2019 | |
| EP | 2913796 B1 | 3/2019 | |
| EP | 3526626 A1 | 8/2019 | |
| EP | 3574285 A1 | 12/2019 | |
| EP | 3646058 A1 | 5/2020 | |
| EP | 3656138 A1 | 5/2020 | |
| HK | 1261850 | 1/2020 | |
| JP | H09142236 A | 6/1997 | |
| JP | 2004348575 A | 12/2004 | |
| JP | 2006276012 A | 10/2006 | |
| JP | 2007298332 A | 11/2007 | |
| JP | 2010175423 A | 8/2010 | |
| JP | 2010533307 A | 10/2010 | |
| JP | 2011529569 A | 12/2011 | |
| JP | 3173419 U | 1/2012 | |
| JP | 2012063173 A | 3/2012 | |
| JP | 2012507011 A | 3/2012 | |
| JP | 2013054660 A | 3/2013 | |
| JP | 2013093738 A | 5/2013 | |
| JP | 2013517483 A | 5/2013 | |
| JP | 2015200615 A | 11/2015 | |
| JP | 2015210186 A | 11/2015 | |
| JP | 2016080572 A | 5/2016 | |
| JP | 2019518222 A | 6/2019 | |
| JP | 2019532433 A | 11/2019 | |
| JP | 6987797 B2 | 12/2021 | |
| WO | 2010004911 A1 | 1/2010 | |
| WO | 2014048475 A1 | 4/2014 | |

(56) References Cited

FOREIGN PATENT DOCUMENTS

| WO | 2014120613 | A1 | 8/2014 |
|---|---|---|---|
| WO | 2014130854 | A1 | 8/2014 |
| WO | 2015105597 | A2 | 7/2015 |
| WO | 2017009923 | A1 | 1/2017 |
| WO | 2017155970 | A1 | 9/2017 |
| WO | 2018071416 | A1 | 4/2018 |
| WO | 2018140701 | A1 | 8/2018 |
| WO | 2019006289 | A1 | 1/2019 |
| WO | 2019018315 | A1 | 1/2019 |
| WO | 2019099605 | A1 | 5/2019 |
| WO | 2019165194 | A1 | 8/2019 |
| WO | 2019178429 | A1 | 9/2019 |
| WO | 2019195270 | A1 | 10/2019 |
| WO | 2020009826 | A1 | 1/2020 |
| WO | 2020507072 | A | 3/2020 |

OTHER PUBLICATIONS

NPL: From Point Clouds to Building Information Models: 3D Semi-Automatic Reconstruction of Indoors of Existing Buildings, Oct. 12, 2017 (Year: 2017).*
18834521.9, "European Application Serial No. 18834521.9, Extended European Search Report dated Apr. 12, 2021", Kaarta, Inc., 9 pages.
Ishii, Masahiro, "A system for acquiring three-dimensional shapes represented by gestures", "Input-Output", Image Labo., vol. 23, No. 3, Image Laboratory, Japan, Japan Industrial Publishing Co., Ltd., vol. 23, 2012, pp. 14-18.
Kim, Bong Keun, "Indoor localization and point cloud generation for builing interior modeling", IEEE RO-MAN, 2013, pp. 186-191.
Mirowski, Piotr, et al., "Depth Camera Slam on a Low-cost WiFi Mapping Robot", Technologies for Practial Rebot Applications (TEPRA), 2012 IEEE International Conference On, IEEE, Apr. 23, 2012, pp. 1-6.
U.S. Appl. No. 16/929,154, filed Jul. 15, 2020, Pending.
U.S. Appl. No. 17/010,045, filed Sep. 2, 2020, Pending.
U.S. Appl. No. 17/061,176, filed Oct. 1, 2020, Pending.
"Measurement accuracy of Lidarbased SLAM systems", Sep. 2016, pp. 1-15.
"Safety Efficiency Performance for Near Earth Flight", www.nearearth.aero, 2015, pp. 1-2.
17763885.5, "European Application Serial No. 17763885.5, Extended European Search Report dated Sep. 17, 2019", Kaarta, Inc., 7 pages.
Belfiore, "This Mobile Device Can Map Your Future Home", https://www.bloomberg.com/news/articles/2017-03-09/this-mobile-device-can-map-your-future-home, Mar. 9, 2017, pp. 1-10.
Besl, et al., "A Method for Registration of 3-D Shapes", IEEE Transactions on Pattern Analysis and Machine Intelligence, vol. 14, No. 2, Feb. 1992, pp. 239-256.
Chen, et al., "Object modelling by registration of multiple range images", Image and Vision Computing, vol. 10, iss. 3, Apr. 1992, pp. 145-155.
Lopez, "Combining Object Recognition and Metric Mapping for Spatial Modeling with Mobile Robots", Master's Thesis in Computer Science at the School of Computer Science and Engineering, 2007, pp. 21-23, 44-56.
PCT/US18/40269, "International Application Serial No. PCT/US18/40269, International Preliminary Report on Patentability dated Jan. 9, 2020", Kaarta, Inc., 12 pages.
PCT/US18/40269, "International Application Serial No. PCT/US18/40269, International Search Report and Written Opinion dated Oct. 19, 2018", Kaarta, Inc., 19 Pages.
PCT/US18/40269, "International Application Serial No. PCT/US18/40269, Invitation to Pay Additional Fees and, Where Applicable, Protest Fee dated Aug. 9, 2018", Kaarta, Inc., 2 Pages.
PCT/US18/42346, "International Application Serial No. PCT/US18/42346, International Preliminary Report on Patentability dated Jan. 21, 2020", Kaarta, Inc., 11 pages.
PCT/US18/42346, "International Application Serial No. PCT/US18/42346, International Search Report and Written Opinion dated Oct. 1, 2018", Kaarta, Inc., 13 Pages.
PCT/US18/61186, "International Application Serial No. PCT/US18/61186, International Preliminary Report on Patentability dated May 28, 2020", Kaarta, Inc., 9 pages.
PCT/US18/61186, "International Application Serial No. PCT/US18/61186, International Search Report and Written Opinion dated Mar. 18, 2019", Kaarta, Inc., 11 pages.
PCT/US18/61186, "International Application Serial No. PCT/US18/61186, Invitation to Pay Additional Fees and, Where Applicable, Protest Fee dated Jan. 16, 2019", Kaarta, Inc., 2 pages.
PCT/US19/22384, "International Application Serial No. PCT/US19/22384, International Preliminary Report on Patentability dated Sep. 24, 2020", Kaarta, Inc., 11 pages.
PCT/US19/22384, "International Application Serial No. PCT/US19/22384, International Search Report and Written Opinion dated Aug. 7, 2019", Kaarta, Inc., 14 pages.
PCT/US2017/021120, "Application Serial No. PCT/US2017/021120, International Search Report and the Written Opinion dated May 31, 2017", 8 pages.
PCT/US2017/021120, "International Application Serial No. PCT/US2017/021120, International Preliminary Report on Patentability and Written Opinion dated Sep. 20, 2018", Kaarta, Inc., 7 Pages.
PCT/US2017/055938, "Application Serial No. PCTUS2017055938, Invitation to Pay Additional Fees dated Nov. 14, 2017", 2 Pages.
PCT/US2017/055938, "International Application Serial No. PCT/US2017/055938, International Preliminary Report on Patentability dated Apr. 25, 2019", Kaarta, Inc., 14 pages.
PCT/US2017/055938, "International Application Serial No. PCT/US2017/055938, International Search Report and Written Opinion dated Feb. 7, 2018", Kaarta, Inc., 17 pages.
PCT/US2018/015403, "International Application Serial No. PCT/US2018/015403, International Preliminary Report on Patentability dated Aug. 8, 2019", Kaarta, Inc., 5 pages.
PCT/US2018/015403, "International Application Serial No. PCT/US2018/015403, International Search Report and Written Opinion dated Mar. 22, 2018", Kaarta, Inc., 12 Pages.
PCT/US2019/019132, "International Application Serial No. PCT/US2019/019132, International Preliminary Report on Patentability dated Sep. 3, 2020", Kaarta, Inc., 13 pages.
PCT/US2019/019132, "International Application Serial No. PCT/US2019/019132, International Search Report and Written Opinion dated May 14, 2019", Kaarta, Inc., 15 pages.
PCT/US2019/022384, "International Application Serial No. PCT/US2019/022384,Invitation to Pay Additional Fees dated May 20, 2019", Kaarta, Inc., 2 pages.
PCT/US2019/025360, "International Application Serial No. PCT/US2019/025360, International Search Report and Written Opinion dated Jun. 21, 2019", Kaarta, Inc., 7 pages.
PCT/US2019/038688, "International Application Serial No. PCT/US2019/038688, International Search Report and Written Opinion dated Sep. 12, 2019", Kaarta, Inc., 12 pages.
Zhang, et al., "Laser-visual-inertial odometry and mapping with high robustness and low drift", wileyonlinelibrary.com/journal/rob, Nov. 10, 2017, pp. 1242-1264.
Zhang, et al., "Laser-visual-inertial Odometry Enabling Aggressive Motion Estimation and Mapping at High Robustness and Low Drift", sagepub.co.uk/journalsPermissions.nav DOI: 10.1177/ToBeAssigned www.sagepub.com/, Nov. 2017, pp. 1-18.
Zhang, et al., "LOAM: Lidar Odometry and Mapping in Real-time", Robotics: Science and Systems Conference, Jul. 2014, 9 pages.
Zhang, "Online Lidar and Vision based Ego-motion Estimation and Mapping", Feb. 2017, pp. 1-130.
Zhang, "Online Mapping with a Real Earth Contour II", https://www.youtube.com/watch?v=CfsM4-x6feU, Nov. 24, 2015.
Zhang, et al., "Real-time Depth Enhanced Monocular Odometry", 2014 IEEE/RSJ International Conference on Intelligent Robots and Systems (IROS 2014), Chicago, IL, USA., Sep. 14-18, 2014, pp. 4973-4980.
Zhang, et al., "Visual-Lidar Odometry and Mapping: Low-drift, Robust, and Fast", 2015 IEEE International Conference on Robotics

(56) References Cited

OTHER PUBLICATIONS and Automation (ICRA), Washington State Convention Center, Seattle, Washington., May 26-30, 2015, pp. 2174-2181.

Zheng, et al., "Non-local Scan Consolidation for 3D Urban Scenes", ACM SIGGRAPH 2010. Retrieved on Jan. 20, 2018., 2010, 9 Pages.

17860192.8, "European Application Serial No. 17860192.8, Extended European Search Report dated Apr. 24, 2020", Kaarta, Inc., 12 pages.

18745179.4, "European Application Serial No. 18745179.4, Extended European Search Report dated Nov. 2, 2020", Kaarta, Inc., 10 pages.

18824609.4, "European Application Serial No. 18824609.4, Extended European Search Report dated Nov. 2, 2020", Kaarta, Inc., 12 pages.

Adler, Benjamin, et al., "Towards Autonomous Airborne Mapping of Urban Environments", Multisensor Fusion and Integration for Intelligent Systems (MFI), 2012 IEEE Conference, 2012, pp. 77-82.

Chen, Chao-I, et al., "Drogue tracking using 3D flash lidar for autonomous aerial refueling", Laser Radar Technology and Applications XVI, 2011, pp. 1-11.

PCT/US2019/025360, "International Application Serial No. PCT/US2019/025360, International Preliminary Report on Patentability dated Oct. 15, 2020", Kaarta, Inc., 6 pages.

PCT/US2019/038688, "International Application Serial No. PCT/US2019/038688, International Preliminary Report on Patentability dated Jan. 14, 2021", Kaarta, Inc., 11 pages.

Wiemann, Thomas, et al., "Automatic Construction of Polygonal Maps From Point Cloud Data", Safety Security and Rescue Robotics (SSRR), 2010 IEEE International Workshop, 2010, pp. 1-6.

Wang, Miao, et al., "Incremental Segmentation of Lidar Point Clouds With an Octree-Structured Voxel Space", The Photogrammetric Record, Mar. 2011, pp. 32-57.

Chow, Jacky C.K, et al., "IMU and Multiple RGB-D Camera Fusion for Assisting Indoor Stop-and-Go 3D Terrestrial Laser Scanning", 2014, 35 pages.

Gupta, Vishisht, "Vehicle localization using low-accuracy gps, imu and Map-aided vision", 2009, 230 pages.

U.S. Appl. No. 17/964,307, filed Oct. 12, 2022, Pending, Zhang, Ji, et al.

\* cited by examiner

| Operate a scanning device to collect point cloud data comprising a point cloud model of an environment. | 200 |

| Apply in real time at least one filter to the point cloud model to produce a filtered model of the environment. | 202 |

| Define in real time a plane in the filtered model corresponding to a horizontal expanse associated with a floor of the environment. | 204 |

| Utilize the defined plane to correct point cloud data as it is collected. | 206 |

Fig. 2

METHODS AND SYSTEMS FOR AUTO-LEVELING OF POINT CLOUDS AND 3D MODELS

STATEMENT OF PRIORITY

This application is a bypass continuation of PCT/US19/38688 entitled "METHODS AND SYSTEMS FOR AUTO-LEVELING OF POINT CLOUDS AND 3D MODELS", filed Jun. 24, 2019.

PCT/US19/38688 claims priority to U.S. Provisional Patent Application Ser. No. 62/694,327, entitled "METHODS AND SYSTEMS FOR AUTO-LEVELING OF POINT CLOUDS AND 3D MODELS," filed on Jul. 5, 2018.

PCT/US19/38688 also claims priority to U.S. Provisional Patent Application Ser. No. 62/696,568, entitled "METHODS AND SYSTEMS FOR AUTO-LEVELING OF POINT CLOUDS AND 3D MODELS," filed on Jul. 11, 2018.

The disclosure of PCT/US18/42346 (Publication No. WO 2019/018315), entitled "ALIGNING MEASURED SIGNAL DATA WITH SLAM LOCALIZATION DATA AND USES THEREOF," filed on Jul. 16, 2018, is incorporated herein by reference in its entirety and for all purposes.

BACKGROUND

Field

The methods and systems described herein generally relate to filtering map data to enhance the efficacy with which newly acquired scan frame data may be localized.

Description of the Related Art

Man-made structures frequently consist of one or multiple horizontal stories or levels. A mobile device with sensors with no absolute position knowledge from an external source such as beacons or Global Navigation Satellite System (GNSS), has only an approximation of absolute gravity direction with which to orient a model. A model with truly horizontal floors makes generating information such as floor plans or building information models more accurate. For example, a floor plan generated from a slice of a non-level point cloud could be off angle and generate a warped perspective of the dimensions of a building.

As noted, buildings generally have multiple horizontal stories, these tend to have flat, level and planar floors and small transitions between stories, such as stairwells. These transitions often introduce a pitch or roll uncertainty between the floors. The result is a model with multiple floors each having a varying small tilt relative to gravity.

What is therefore needed is a method by which the assumption of a planar or otherwise flat floor in a building structure may be leveraged to produce more accurate 3D models of such structures.

SUMMARY

In accordance with an exemplary and non-limiting embodiment, a method comprises creating a point cloud model of an environment; applying at least one filter to the point cloud model to produce a filtered model of the environment and defining a plane in the filtered model corresponding to a horizontal expanse associated with a floor of the environment.

In accordance with an exemplary and non-limiting embodiment, a method comprises operating a scanning device to collect point cloud data comprising a point cloud model of an environment, applying in real time at least one filter to the point cloud model to produce a filtered model of the environment, defining in real time a plane in the filtered model corresponding to a horizontal expanse associated with a floor of the environment and utilizing the defined plane to correct point cloud data as it is collected.

In accordance with an exemplary and non-limiting embodiment, a system comprises a camera unit, a laser scanning unit, an inertial measurement unit (IMU) and a computing system in communication with the camera unit and the laser scanning unit, wherein the computing system comprises at least one processor adapted execute to software that when executed causes the system to create a point cloud model of an environment, apply at least one filter to the point cloud model to produce a filtered model of the environment and define a plane in the filtered model corresponding to a horizontal expanse associated with a floor of the environment.

In accordance with an exemplary and non-limiting embodiment, a system comprises a camera unit, a laser scanning unit and a computing system in communication with the camera unit and the laser scanning unit, wherein the computing system comprises at least one processor adapted execute to software that when executed causes the system to collect point cloud data comprising a point cloud model of an environment, apply in real time at least one filter to the point cloud model to produce a filtered model of the environment, define in real time a plane in the filtered model corresponding to a horizontal expanse associated with a floor of the environment and utilize the defined plane to correct point cloud data as it is collected.

BRIEF DESCRIPTION OF THE FIGURES

FIG. 2 illustrates a flow chart of an exemplary and non-limiting embodiment.

DETAILED DESCRIPTION

Man-made structures frequently consist of one or multiple horizontal stories or levels. 3D models made of these structures by mobile devices can be improved by leveraging this assumption. A mobile device with sensors, such as a simultaneous localization and mapping (SLAM) system, with no absolute position knowledge from an external source such as beacons or Global Navigation Satellite System (GNSS), has only an approximation of absolute gravity direction with which to orient a model. A model with truly horizontal floors makes generating information such as floor plans or building information models more accurate. For example, a floor plan generated from a slice of a non-level point cloud may be off angle. In such instances, a non-level point cloud may result in the generation of a warped perspective of the dimensions of a building's floor plan.

As noted, buildings are generally comprised of multiple horizontal stories, wherein each discreet story tends to be comprised of flat floors and small transitions between stories, such as stairwells. These transitions often introduce a pitch or roll uncertainty between the floors. The result is a model with multiple floors each having a varying small tilt relative to gravity.

In the various exemplary and non-limiting embodiments that follow, there are described methods that operate to process point cloud data, identify the generally flat expanses corresponding to floors and adjust the point cloud data such that the floors are rendered as horizontal planes. As described more fully below, such adjusted point cloud data facilitates a more accurate generation of floor plans, CAD models and the like.

Figure 1:
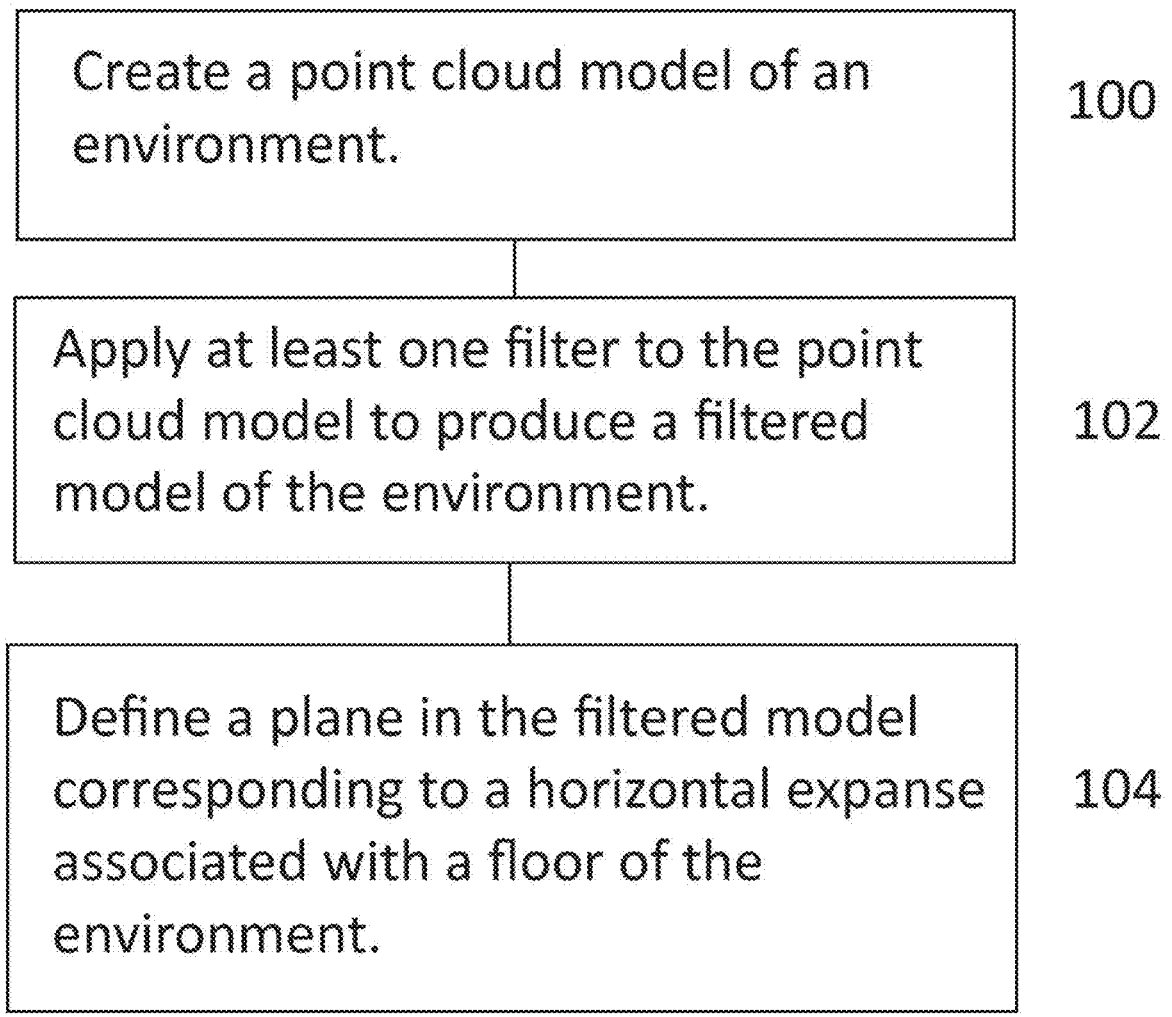
FIG. 1 illustrates a flow chart of an exemplary and non-limiting embodiment.

With reference to FIG. 1, there is illustrated an exemplary and non-limiting embodiment of a method. As described more fully below, first, at step 100, a point cloud model of an environment is created. Next, at step 102, at least one filter is applied to the point cloud model to produce a filtered model of the environment. Lastly, at step 104, a plane is defined in the filtered model corresponding to a horizontal expanse associated with a floor of the environment.

With reference to FIG. 2, there is illustrated an exemplary and non-limiting embodiment of a method. As described more fully below, first, at step 200, a scanning device is operated to collect point cloud data comprising a point cloud model of an environment. Next, at step 202, at least one filter is applied to the point cloud model to produce a filtered model of the environment. Next, at step 204, there is defined in real time a plane in the filtered model corresponding to a horizontal expanse associated with a floor of the environment. Lastly, at step 206, the defined plane is utilized to correct point cloud data as it is collected.

Well known methods including, but not limited to, Random Sample Consensus RANSAC), may be utilized to find horizontal planes in point cloud data and determine relative pitch and roll rotations to level large planar surfaces.

In accordance with an exemplary and non-limiting embodiment, a point cloud formed from a single-story building may be leveled. Using RANSAC, one may attempt to fit a horizontal planar model to a 3D point cloud that has the highest number of inliers by iteratively fitting a planar model to a random sampling of points and checking the number of inliers for that solution, repeating for a number of iterations and selecting the result with the highest number of inliers, which is statistically likely to be the largest plane. That plane may then be refined further by fitting the inliers to a best fit plane. Increased likelihood of a best possible solution can be achieved by either increasing the number of iterations or, more interestingly, reducing the number of points that are considered by RANSAC to the most likely candidates.

Exemplary methodologies for reducing the number of candidates may be done in a few ways, for example:
1. Down-sampling the point cloud data spatially, such as by minimum distance between points to even out density, sensor noise, and fine features that are not important in large plane detection.
2. Filtering by local curvature by small values, which indicate a point is part of a locally planar surface.
3. Filtering by point normal direction to only points with a normal that is close to vertical and upward (indicating it is part of a vertical surface viewed from above).
4. Filtering based on z height. This may be done by assuming a range of possible scanner heights off the floor if the scanner locations within the map are known.
5. Reducing search through the assumption that walls, floors, and ceilings are typically parallel or orthogonal to each other. That is, floor to ceiling to next floor helps constrain the search.

The fewer non-floor points that are injected into RANSAC, the higher the odds are of finding the correct floor plane and fewer iterations are needed to be confident in the result. With fewer points each individual iteration may count inliers much faster while producing a good result quickly.

In other exemplary embodiments, one may subsample the point cloud dataset. For example, one may drop points from the point cloud dataset when there are points nearby within a predefined distance threshold. As described more fully below, such sampling results in quicker processing times.

Further exemplary embodiments may employ height filtering. A first element of this process involves, with respect to an individual floor, identifying candidates for what might be a floor so as to enable computing the pitch, roll and height of the floor. In accordance with an exemplary embodiment, one may detect where a scanning device was operated on a floor in order to perform a first order floor estimation and acquire a starting point for looking for the floor. For example, one may presume that a floor will be below where a device is held. Further, knowing the approximate height above a floor from which individuals typically operate such a device may serve to further constrain the parameters for evaluating a floor surface within a point cloud. For example, such an assumption may serve to eliminate the consideration of table tops as possible floor surfaces.

Further exemplary embodiments may employ normal vector filtering. For example, after computing normals for points in a point cloud, the surface normal vectors for a floor should generally be pointing straight up within a few degrees of vertical, depending upon the accuracy of the IMU gravity vector prediction and the laser mapping quality. One may therefore filter the dataset to contain only those points with approximately vertical normals.

Further exemplary embodiments may employ curvature filtering. Curvature is a good predictor of floors as points on a floor have low curvature unless they are near a wall or object on the floor, these floor edge points are not needed in the prediction and can be more subject to noise and error. Therefore, filtering out subsets of points indicative of a fitted curved surface may enhance the accuracy of identifying floor surfaces.

After the application of any of the above described exemplary filtering techniques, one is left with a reduced dataset that may be fed into a RANSAC method as described more fully below. The RANSAC method picks three points at random and fits a plane to those points. A pitch and roll of this fitted plane may then be calculated to determine if it is within the expected error for the floor plane inclination. If it is, the plane is kept. If not, the plane is discarded and the next set of 3 random points is selected. If the plane is kept, the next step computes how well the plane so described fits the surrounding data by counting the number of points within an inlier distance of the plane. After numerous iterations, the plane with the most inliers is determined. The plane is then refined by fitting all inliers in this randomly generated plane to a plane of best fit to the inliers by a distance minimization optimization to provide a more accurate floor plane. This can be iterated to refine selected inliers by distance and plane parameters of best fit to refine further. Once a refined floor plane is determined the pitch and roll of the plane are calculated. This pitch and roll may then be used to rotate the point cloud so as to create a level point cloud.

Alternate embodiments of floor plane finding may use surface normal directions on points to either 1) pre-filter point cloud data to points with normal directions close to Z+, or 2) to use selection of a single random point with normal direction to define planes in the iterative plane fitting.

This process may then be repeated for multiple floor levels. In one embodiment, one may proceed through the data from time zero until the end and adjust the data from a present floor to subsequent floors. For example, if one scans three floors, the full dataset will first be leveled to the first floor. One may then level the second and third floors to the second floor. Finally one may level the third floor to itself, assuming there are no more floors. Generally, this method corrects problems arising from a progressive buildup of errors. For example, if each of three floors were perceived as tilting 1 degree progressively in the same direction, this method would help to eliminate the artifact. The result is a reduction in error stack up and discontinuities between floors.

As noted, once a plane is detected, the planar parameters can be used to determine a relative pitch, roll and z-value of the detected floor. Each point within the point cloud can then be adjusted based on these to generate a model with a level floor at a set height. For example, the first floor could be set to z=0 after the adjustment so its height known for other post-processing steps such as generating horizontal slices at predetermined heights for floor plans.

Another common exemplary application is a model of a multi-story building. In this case it cannot be assumed that each story in the model is tilted in the same direction. This is amplified by the degree of modeling challenges in floor transition environments, like stairwells. SLAM systems commonly exhibit high errors in these environments and small angular errors introduced in floor transitions can produce models that are visibly errant between stories, potentially with one story running into another or drifting away. Correcting this manually can be difficult and time consuming.

Multi-story models generated by mobile devices with knowledge of the acquisition time and location of all points in the model present a particular solution to this problem. An implementation of floor transition detection for automatic multi-story leveling tracks the z-height over time of the trajectory to provide a first indication of floor transitions. This may be done by moving through the trajectory in time order and maintaining a continuous average of the z-height and looking for situations where that average have low variability for a time then the next trajectory points consistently deviate from that average in one direction, indicating a stairwell or other transition. This provides a time range for a single floor within both the trajectory and point cloud model. For example, one may track an average z-height while scanning as a device operator walks through an environment from time zero to an end of the scan and look for times when the device remains at the same height for a prolonged period of time before ascending or descending. It may then be assumed that the time spent at relatively constant z-height represents scanning data collected on a single floor.

In some instances, one may actually be imaging on a slight but real incline such as, for example, in a transition from one floor to the next in a parking garage. In such instance, a predetermined threshold for surface angle, such as, for example, five degrees, may be used to differentiate between a flat surface and a true incline. Additionally, looking at the laser mapping results in the region of a change in local surface angle may indicate the difference between the start of a ramp and a local tilt error in the point cloud. For example, in an open parking garage, if one were to examine the laser matching covariance matrices between data before and after the start of a new ramp, one would see that the laser mapping was very confident in the change in pitch and roll for flat to inclined and a potential leveling operation could be rejected. Further, use of a multi-story leveling technique may be restricted to use only within a multi-storied building wherein floor levels are transitioned via stairwells or similar modes of transition rather than a heavily sloped environment where differentiating what should be level can introduce error. In one embodiment, a user might first scan segments of the building that fit this assumption, perform a leveling correction, and then scan the remaining parts of the building with this corrected model as a prior map. Another method for avoiding such situations may involve fitting a plane to the trajectory points and observing outliers to the plane indicating a reduced spread in the x and y directions. Because there are many fewer trajectory points compared to point cloud point data, one may quickly determine time periods wherein data was collected in environments not having a flat floor and remove point cloud data matching such periods from consideration.

Next, to validate this observation, RANSAC may operate on the trajectory segment to see if the values fit a plane with sufficient x-y variation and minimal z variation to suggest a high probability that the data indicates scanning of a story of a building and to determine a typical held-height of the device during that time range. With this information, the point cloud data can now be filtered by time collected and height range based on the calculated held-height and an assumed range of held-heights above the floor. Data can then be filtered by similar means the single floor implementation (such as spatial sub-sampling, normal direction, and curvature). RANSAC is then performed on this subset of data for a planar fit with associated pitch and roll corrections.

These corrections may then be applied to all point cloud and trajectory data from the start of this time range onward (for the first correction all data starting from time 0 is corrected), including after leaving the current floor, i.e., the second and third floors scanned are first leveled to the first floor scanned.

The process continues moving through the data by time looking for the next time the z-value stabilizes, indicating a new floor. Data from the start time of this new floor onward is then leveled. This continues through the data looking for any number of distinguishable building levels or stories in the data.

An important remaining issue is adjusting the z-height of the new floor after pitch and roll corrections. An implementation of this "hinges" the rotation about the first observed trajectory point on the new level such that after transformation, that first point after ascending the stairs remains in the same x-y-z location. This prevents a discontinuity in the data and means that the floor to floor height in the resulting data is based on the observed height change in the stairwell.

More specifically, in some instances, when leveling the pitch and roll of a floor, one may hinge the collected data about something. For example, when tilting the dataset, everything will rotate about some line or point. In one embodiment, the dataset may be hinged about the first trajectory point on a new floor. This serves to reduce the production of a discontinuity at the point of entrance to a floor as one might expect if a point in the middle of a floor was chosen about which to tilt the dataset. In some instances, when returning to a previously scanned floor level, one may opt to level the subsequently acquired floor data to the previously leveled floor height and may occasion a discontinuity from a stairwell or the like to the newly acquired floor data. Identifying situations when one returns to a previously scanned floor may reduce the instance of double registration of the same surface and avoid pulling or warping data unnecessarily.

In some embodiments, measuring the height of stairwells may aid in establishing ceiling heights on each floor. For example, if the user scans two connecting stairwells each with a predicted height, the average could be taken to improve the estimate. Potentially further refined by weighting the average by the value of the scanning confidence level in each stairwell.

In some embodiments, one may utilize barometric pressure sensors/altimeter to establish scanning height and subsequent floor height.

Another common situation involves revisiting a previously scanned floor. In this case the system may not have placed the two time segments of the data at the same z-height. This can be adjusted by determining potential floor revisits by checking against prior floor heights and, if there is a close enough match, shifting the detected revisit to the prior floor level as noted above.

An interesting potential application of this technique exists for deeper integration of this approach with SLAM systems. Since this technique works by moving forward through the data in time, it may be implemented in real-time during SLAM processing to provide better modeling results. For example, if the floor is leveled in real-time, the IMU estimates of gravity vector may more appropriately match the map that is being built and lead to better scan to map matching. Additionally, if building stories are revisited, adjusting the new data to the correct level may improve the alignment of revisited parts of the story preventing double registration of these regions.

More specifically, in some instances, real time correction of floor data while scanning, referred to as "live scanning" may allow one to use an established floor level while scanning to improve the process of scanning in difficult environments. For example, if, instead of waiting until one leaves a floor to detect a floor level and adjust the data, one adjusts the data in real time as soon as there is enough data to establish such an adjustment, one might use the floor level as a step in an optimization process to align new scan data. For example, if one had a model of a large room on one level having a well defined floor level and one walks through a doorway to a new space, it is possible that the new data might be introduced with a pitch and roll relative to the previous defined floor level. If one identifies this scenario in real time, one may lock the subsequent floor data to the height of the floor in the previous room.

Another exemplary and non-limiting embodiment encompasses the extension of floor level detection and tracking used as a constraint to assist in scan matching while on a single floor. For example, once enough data is captured on a building story, the floor plane may be detected, then floor planes in new frames of scan data may be calculated and corrections may be applied to bring this data into level with the existing floor either to refine the initial guess of fit before scan matching or as a constraint in the scan matching optimization function.

In particular, a solution that iterates from MU data, to visual odometry data, to laser odometry data, to laser mapping with each step providing an initial guess into the following step could insert a step between laser odometry and mapping that levels a detected floor, if size and spread checks were met. That would allow laser mapping to override this correction if the rest of the data does not support this level floor assumption, as would happen if ascending a ramp.

Alternately, the locally level constraints may be combined with laser mapping results in a batch optimization method that takes into account individual scan to scan matches to refine the overall model iteratively. Applying a weighting to the "floor smoothness" may serve to adjust how this optimization would weigh conflicting scan matching and floor smoothness constraints depending on environmental assumptions and desired results.

These extensions of floor leveling are particularly powerful in correcting common issues introduced in degraded environments for scanning where laser mapping estimates become suspect. For example, in doorway transitions, a small pitch and/or roll may be introduced in the new room or in long narrow hallways and a slight rise or fall in the data over distance is common.

Figure 3A:
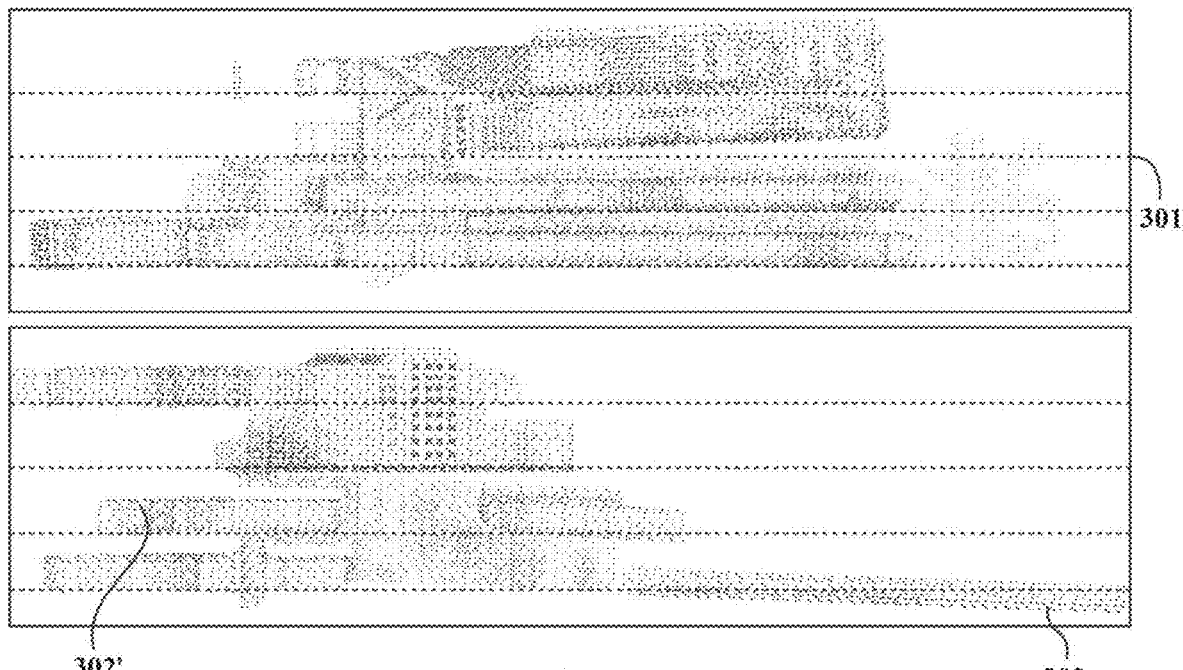
FIGS. 3A-3B illustrate an exemplary and non-limiting embodiment of applying filtering and a RANSAC method to a point cloud.
Figure 3B:
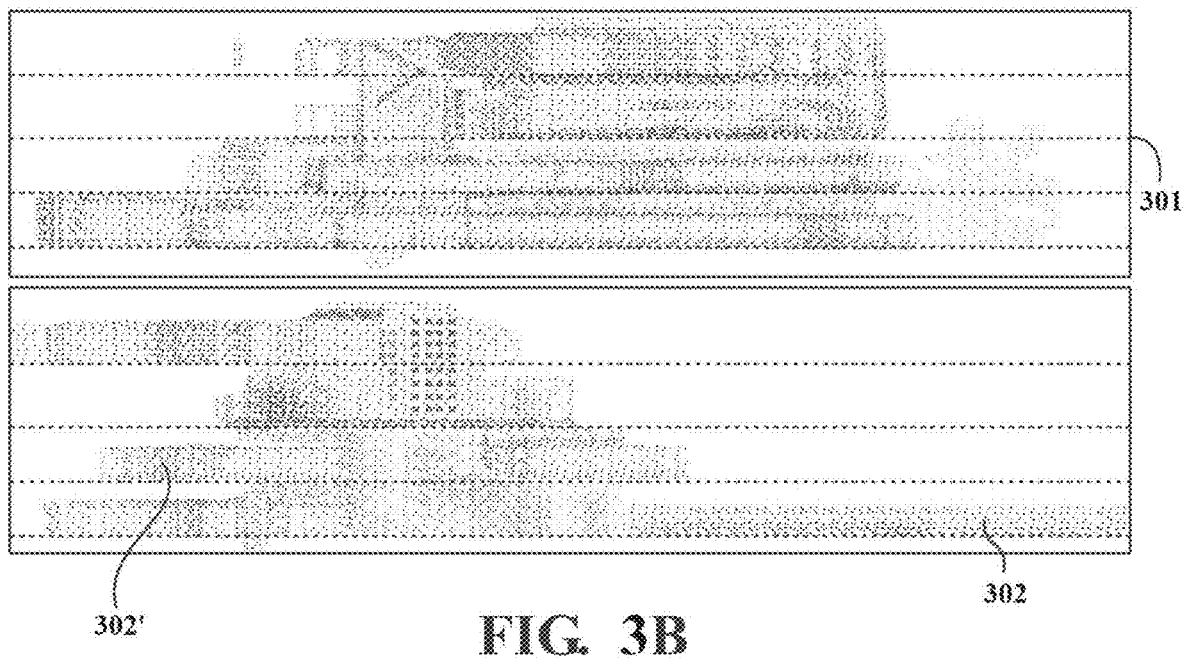

With reference to FIGS. 3A-3B, there is illustrated an exemplary and non-limiting embodiment of a side view of a point cloud model of a four story building to which the above described have been applied. FIG. 3A is an illustration of the point cloud prior to filtering and the application of a RANSAC method. Floor indicator 301 identifies an exemplary ideal floor level. Note that portions of the point cloud forming the first floor 302 and the second floor 302' dip below the corresponding floor indicators 301. FIG. 3B is an illustration of the point cloud post the application of filtering and the application of a RANSAC method. Note that portions of the point cloud forming the first floor 302 and the second floor 302' are significantly mote in correspondence to floor indicators 301. This correspondence is indicative of the correction of the point cloud to map portions of the point cloud corresponding to flat floors to flat planes.

The use of Simultaneous Localization and Mapping (SLAM) devices in the production of point clouds is described, for example, in PCT/US18/42346 (Publication No. WO 2019/018315), entitled "ALIGNING MEASURED SIGNAL DATA WITH SLAM LOCALIZATION DATA AND USES THEREOF," filed on Jul. 16, 2018, which is incorporated herein by reference in its entirety and for all purposes.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores to provide speed improvements.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network has sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "has sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method comprising:
   creating a point cloud model of an environment;
   applying at least one filter to the point cloud model to produce a filtered model of the environment, wherein:
   the at least one filter removes at least one point from the point cloud model,
   the at least one filter is a height filter,
   applying the height filter comprises dropping one or more points from the point cloud model each of which located outside of a predetermined distance range from a scanning device when producing the point cloud model, and
   the predetermined distance range corresponds to a range of distance encompassing an average distance from the scanning device to a floor surface; and
   defining a plane in the filtered model corresponding to a horizontal expanse associated with a floor of the environment.

2. The method of claim 1, further comprising applying a rotation to the point cloud model to align at least one data point of the point cloud model with the defined plane.

3. The method of claim 1, wherein the applying comprises applying a sub-sampling filter.

4. The method of claim 3, wherein the sub-sampling comprises dropping at least one point forming a part of the point cloud model based, at least in part, on a minimum distance of the at least one point form another point forming a part of the point cloud model.

5. The method of claim 1, wherein the applying comprises applying a curvature filter.

6. The method of claim 1, wherein the applying comprises applying a normal vector filter.

7. The method of claim 1, wherein the defining comprises applying a Random Sample Consensus (RANSAC) method to the filtered model.

8. The method of claim 7, wherein the RANSAC identifies the plane having a determined pitch and a determined roll.

9. The method of claim 8, further comprising applying a rotation to the point cloud model to align at least one data point of the point cloud model with the defined plane using, at least, the determined pitch and the determined roll.

10. The method of claim 8, wherein steps of applying and defining are repeated to identify a plurality of planes each corresponding to a single floor of a building.

11. The method of claim 10, wherein each of the plurality of planes is adjusted to a previous plane in sequence.

12. The method of claim 10, wherein a transition between a first floor and a second floor of the building is identified based on, at least, a stabilized z-value over a predetermined period of time of one or more points of the point cloud model.

13. A system comprising:
   a camera unit;
   a laser scanning unit; and
   a computing system in communication with the camera unit and the laser scanning unit, wherein the computing system comprises at least one processor adapted execute to software that when executed causes the system to:
   create a point cloud model of an environment;
   apply at least one filter to the point cloud model to produce a filtered model of the environment, wherein:
   the at least one filter removes at least one point from the point cloud model,
   the at least one filter is a height filter,
   applying the height filter comprises dropping one or more points from the point cloud model each of which located outside of a predetermined distance range from a scanning device when producing the point cloud model, and
   the predetermined distance range corresponds to a range of distance encompassing an average distance from the scanning device to a floor surface; and
   define a plane in the filtered model corresponding to a horizontal expanse associated with a floor of the environment.

14. The system of claim 13, wherein the processor is further adapted to apply a rotation to the point cloud model to align at least one data point of the point cloud model with the defined plane.

15. The system of claim 13, wherein the applying comprises applying a sub-sampling filter.

16. The system of claim 15, wherein applying the sub-sampling filter comprises down-sampling the point cloud model.

17. The system of claim 16, wherein the down-sampling comprises dropping at least one point forming a part of the point cloud model based, at least in part, on a minimum distance of the at least one point form another point forming a part of the point cloud model.

18. The system of claim 13, wherein the applying comprises applying a curvature filter.

19. The system of claim 13, wherein the applying comprises applying a normal vector filter.

* * * * *